United States Patent Office 3,008,870
Patented Nov. 14, 1961

3,008,870
CUPROUS ALKYL MERCAPTIDE INSECTICIDES AND FUNGICIDES
Tyson H. Mailen and Clyde W. Mertz, Bartlesville, Okla., assignors to Phillips Petroleum Company, a corporation of Delaware
No Drawing. Filed Mar. 26, 1959, Ser. No. 802,029
13 Claims. (Cl. 167—22)

This invention relates to plant benefitting agents. In one of its aspects, the invention relates to the use of cuprous alkyl mercaptides on plants to help the plants to recover from attacks by fungi, mildew, etc. In another of its aspects, the invention relates to the use of cuprous alkyl mercaptides to protect plants against the ravages of insects, such as grasshoppers. In a further aspect of the invention, it relates to the killing of fungi, mildew, etc. on plants or at other places where these may be present by contacting the same with a cuprous alkyl mercaptide. In a further aspect of the invention, it relates to the killing or combatting of insects, as grasshoppers, on or near plants or wherever the insects may be present.

It has been found that the application of certain cuprous alkyl mercaptides to plants affected with fungus growth and visibly suffering therefrom benefits the plants. It has also been found that the said mercaptides will kill an insect, such as a grasshopper. Grasshoppers are known to be ravagers of plants of all kinds.

An object of the invention is to provide a method of benefitting plants. Another object of the invention is to provide a method of helping a plant overcome an attack of fungi, mildew, etc. A further object of the invention is to provide a method of killing an insect which ravages a plant.

Other aspects, objects and the several advantages of the invention are apparent from a study of this disclosure and the appended claims.

According to the present invention, there is provided a method of benefitting a plant by applying to said plant a benefitting amount, or an effective amount, of a cuprous alkyl mercaptide.

When the plant is diseased, as when attacked by fungus, etc., the cuprous alkyl mercaptide agent of the invention can be applied in solution or in dust form and usually is applied in a low concentration of the order of 0.01–5 percent. More or less agent in the composition applied is usually not advantageous. One skiled in the art can readily determine the concentration of the specific cuprous alkyl mercaptide selected which he will use in a given case. This can be done, as he will know, by mere routine tests. The agent of the invention can be applied without dilution of any kind but this is not now preferred when treating plants. The concentrations given herein are by way of guidance only.

When applying the agent of the invention to kill or seriously hurt an insect to deter it from ravaging a plant, the agent can also be used in solution or in dust form. When the agent is a solid, it can be dusted in substantially pure form. When liquid, or applied as a liquid as in a dispersion or a solution, the agent usually will be in a concentration of 0.05–5 percent or more. The amount of solution or dispersion applied will, of course, determine the total effective concentration.

The examples herein given are evidence of various concentrations which can be used to begin with and on which determination of other concentrations can be based.

The agents of the invention appear to possess little, if any, phytotoxicity.

The agents now preferred are the following cuprous alkyl mercaptides:

Cuprous methyl mercaptide
Cuprous tertiary-butyl mercaptide
Cuprous tertiary-octyl mercaptide Generally, the agents of the invention are cuprous alkyl mercaptides of the formula RSCu wherein R is an alkyl group having 1 to 8 carbon atoms.

The cuprous agents of the invention are, all of them, solids. Indeed, these copper mercaptides are water repellent, water insoluble compounds. They are ground to a fine powder, preferably with kaolin clay, and are applied as dusts or as suspensions of the dusts in water. If desired, emulsifiers, such as Triton X–100 and X–301 which are commercially available emulsifiers, can be used.

In the following, there is tabulated information illustrating an aspect of this invention.

EXAMPLE I

*Table I*

COMPOUNDS TESTED FOR FUNGICIDAL ACTIVITY ON POWDERY MILDEW ON SUNFLOWERS

| Compound | Concentration, Weight Percent |
|---|---|
| Cuprous methyl mercaptide | 0.1 / 0.3 |

EXAMPLE II

*Table II*

CUPROUS MERCAPTIDES TESTED FOR CONTROL OF GRASSHOPPERS

| | Method of Application | Concentration, wt. percent | Number Treated | Number Dead at hrs. | | | Percent Kill at 48 hrs. | Remarks |
|---|---|---|---|---|---|---|---|---|
| | | | | 12 | 24 | 48 | | |
| Malathion, 57% | Spray hoppers | 0.1 | 10 | 0 | 5 | 8 | 80 | Other two near death. |
| Tetraethylpyrophosphate | do | 0.1 | 10 | 4 | 10 | 10 | 100 | |
| I. Cuprous Mercaptides: | | | | | | | | |
| methyl | Dust on paper | 100 | 12 | 6 | 11 | 12 | 100 | Two tests. |
| tertiary-butyl | do | 100 | 12 | 7 | 10 | 10 | 83 | Do. |
| tertiary-octyl | 25% Dust on paper | 25 | 10 | 2 | 4 | 8 | 80 | |
| tertiary-octyl | Dust on paper | 100 | 10 | | 10 | | 100 | |

The 25% dust was obtained by grinding the mercaptide to a fine powder with kaolin clay.

The application, to provide the dust on paper, was made by hand simply to obtain a very fine layer or distribution of the dust particles on the paper. Thus, substantially only the feet of the grasshoppers contacted the dust.

Reasonable variation and modification are possible within the scope of the foregoing disclosure and the appended claims to the invention, the essence of which is that there have been provided a method for the benefitting of plants, more specifically, for the benefitting of plants affected with fungus or attacked by insects, more specifically, that there have been provided a method for discouraging or killing the growth of fungus, especially as found on plants and for killing insects as can be found on plants.

We claim:

1. A method for protecting a living plant against attack by fungi and mildew which comprises applying to said plant cuprous alkyl mercaptide having the formula RSCu wherein R is an alkyl group having from 1 to 8 carbon atoms.

2. A method of protecting a living plant against attack by fungi and mildew which comprises applying to said plant cuprous methyl mercaptide.

3. A method of protecting a living plant against attack by fungi and mildew which comprises applying to said plant cuprous tertiaryl-butyl mercaptide.

4. A method of protecting a living plant against attack by fungi and mildew which comprises applying to said plant cuprous tertiary-octyl mercaptide.

5. A method of killing a fungus which comprises attacking said fungus with an effective amount of cuprous alkyl mercaptides selected from the group consisting of mercaptides having the following formula:

RSCu wherein R is an alkyl group having from 1 to 8 carbon atoms.

6. A method of killing a fungus which comprises applying to said fungus an effective quantity of cuprous alkyl mercaptide selected from the group consisting of mercaptides having the following formula RSCu wherein R is an alkyl group having from 1 to 8 carbon atoms.

7. A method of killing a fungus which comprises applying to said fungus an effective quantity of cuprous methyl mercaptide.

8. A method of killing a fungus which comprises applying to said fungus an effective quantity of cuprous tertiary-butyl mercaptide.

9. A method of killing a fungus which comprises applying to said fungus an effective quantity of cuprous tertiary-octyl mercaptide.

10. A method of killing an insect which comprises contacting said insect with an insecticidal quantity of cuprous alkyl mercaptide having the formula RSCu wherein R is an alkyl group having 1 to 8 carbon atoms.

11. A method of killing an insect which comprises contacting said insect with an insecticidal quantity of cuprous methyl mercaptide.

12. A method of killing an insect which comprises contacting said insect with an insecticidal quantity of cuprous tertiary-butyl mercaptide.

13. A method of killing an insect which comprises contacting said insect with an insecticidal quantity of cuprous tertiary-octyl mercaptide.

References Cited in the file of this patent
UNITED STATES PATENTS

| | | |
|---|---|---|
| 1,176,056 | Heinemann | Mar. 21, 1916 |
| 2,533,744 | Skinner | Dec. 12, 1950 |
| 2,779,703 | Crouch | Jan. 29, 1957 |